L. V. B. MARTIN.
SUBSOIL PLOW.

No. 108,164. Patented Oct. 11, 1870.

Witnesses. L. V. B. Martin, Inventor

United States Patent Office.

LUCIAN V. B. MARTIN, OF TUSCALOOSA, ALABAMA.

Letters Patent No. 108,164, dated October 11, 1870.

IMPROVEMENT IN SUBSOIL-PLOWS.

The Schedule referred to in these Letters Patent and making part of the same.

*To all whom it may concern:*

Be it known that I, LUCIAN V. B. MARTIN, of Tuscaloosa, in the county of Tuscaloosa and State of Alabama, have invented a new and improved Subsoil-Plow; and I do hereby declare the following to be a full, clear, and exact description of the same, reference being had to the accompanying drawing making a part of this specification, in which—

Figure 1:
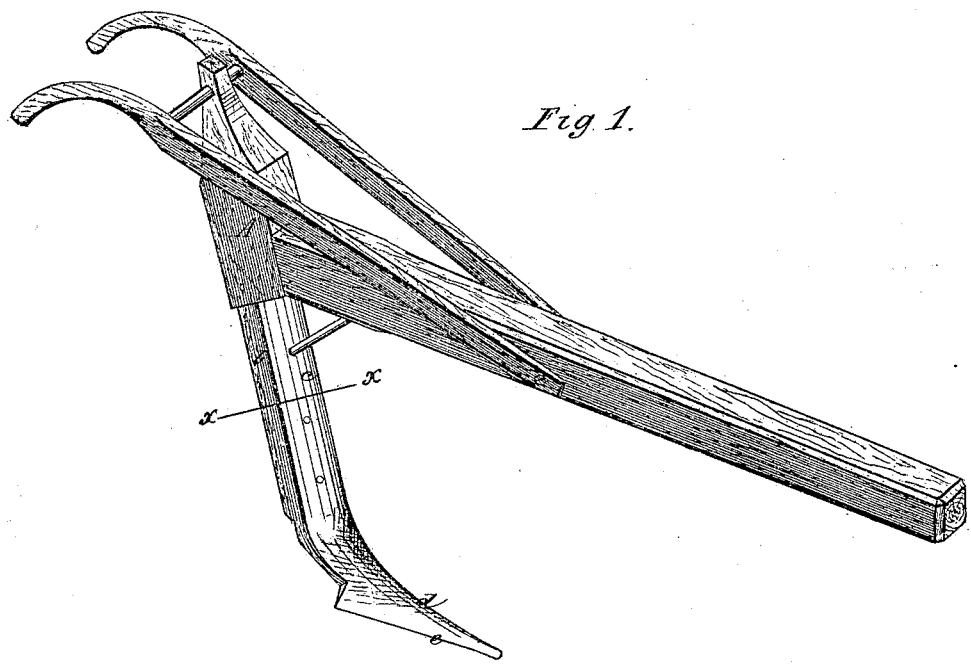
Figure 1 is a view in perspective.
Figure 2:
Figure 2 is a sectional view through the line $x\,x$, showing the shape of the shank and colter.

This invention relates to subsoil-plows, and consists in so constructing the shovel and its shank in one piece, and so arranging the latter with the beveled stock or standard of the plow, as not only to protect the same, but to form a colter or cutting-edge and an inclined surface, as hereinafter described.

In the drawing—

A is a scooter or shovel-stock, provided with an extraordinary long shank, $b$, beveled to a feather edge on its land-side, at an easy angle, that will permit the dirt to slide off readily.

To the shank $b$ is fitted and fastened a cast-iron or wrought-iron plate, $c$, having a corresponding cutting-edge, and terminating in a keen-pointed cutter, $d$, with a cutting-wing, $e$, extending along its right side.

As the point of the cutter $d$ enters the ground, the wing $e$ cuts under, and the sharp edge of the plate cuts off the dirt, which readily slides off from the angling surface of the plow, without turning, while, at the same time, it is sufficiently displaced to become broken thoroughly.

Having thus described my invention,

What I claim as new, and desire to secure by Letters Patent, is—

The shank and shovel, formed in one piece, when applied to the inclined or beveled stock A, and provided with the cutting-edges $d$ and $e$, all constructed and arranged in the manner described, to operate as specified.

LUCIAN V. B. MARTIN.

Witnesses:
J. W. STRUDWICK,
J. M. MARTIN.